(12) United States Patent
Booth et al.

(10) Patent No.: US 7,971,610 B2
(45) Date of Patent: Jul. 5, 2011

(54) TUBULAR BODIES AND METHODS OF FORMING SAME

(75) Inventors: John Peter Booth, Huddersfield (GB); Gordon David Lovis, Abbotsley (GB)

(73) Assignee: ITI Scotland Limited, Glasgow (GB)

( * ) Notice: Subject to any disclaimer, the term of this patent is extended or adjusted under 35 U.S.C. 154(b) by 1090 days.

(21) Appl. No.: 11/631,315

(22) PCT Filed: Jul. 4, 2005

(86) PCT No.: PCT/GB2005/050101
§ 371 (c)(1), (2), (4) Date: Mar. 8, 2007

(87) PCT Pub. No.: WO2006/016190
PCT Pub. Date: Feb. 16, 2006

(65) Prior Publication Data
US 2008/0190508 A1    Aug. 14, 2008

(30) Foreign Application Priority Data
Jul. 2, 2004 (GB) .................................. 0414837.5

(51) Int. Cl.
*F16L 9/16* (2006.01)
*F16L 11/16* (2006.01)

(52) U.S. Cl. ........ 138/131; 138/134; 138/135; 138/172; 138/143; 156/143; 156/195

(58) Field of Classification Search ................... 138/134, 138/135, 138, 133, 129, 132, 130, 131, 172, 138/143; 156/143, 195
See application file for complete search history.

(56) References Cited

U.S. PATENT DOCUMENTS

| | | | |
|---|---|---|---|
| 1,091,759 A | | 3/1914 | Paradis |
| 1,145,434 A | * | 7/1915 | Pechstein ...................... 138/131 |
| 1,365,306 A | | 1/1921 | Dickinson |
| 3,530,567 A | | 9/1970 | Secord |
| 3,880,195 A | | 4/1975 | Goodrich et al. |
| 3,990,478 A | | 11/1976 | McFarland .................... 138/103 |
| 4,033,612 A | | 7/1977 | Chevalier et al. |
| 4,308,082 A | | 12/1981 | Menzel ........................... 156/91 |
| 4,657,049 A | | 4/1987 | Fourty et al. |
| 4,688,319 A | | 8/1987 | Gross et al. |
| 4,800,928 A | * | 1/1989 | Kanao ........................... 138/122 |

(Continued)

FOREIGN PATENT DOCUMENTS

DE    854 608    11/1952

(Continued)

OTHER PUBLICATIONS

EP examination Communication dated Nov. 28, 2008 for EP 05 756 248.0 (12 pages).

(Continued)

*Primary Examiner* — Patrick F Brinson
(74) *Attorney, Agent, or Firm* — Nixon & Vanderhye, P.C.

(57) ABSTRACT

A tubular body comprises an inner hollow core and an outer casing of one or more strips of self mechanically inter-engaging helically wound material having a higher yield strength than that of the core material. Also provided is a method of forming the tubular body comprising the steps of winding the outer core onto the inner core and an end connector for use with said tubular body when said body is provided with helically extending detents on an outer surface thereof.

50 Claims, 7 Drawing Sheets

U.S. PATENT DOCUMENTS

| | | | |
|---|---|---|---|
| 4,823,847 A | | 4/1989 | Grosse et al. |
| 5,117,874 A | | 6/1992 | Ochiai et al. |
| 5,275,209 A | | 1/1994 | Sugier et al. ............... 138/135 |
| 5,573,038 A | * | 11/1996 | Kanao ............................ 138/122 |
| 5,645,110 A | * | 7/1997 | Nobileau ...................... 138/134 |
| 5,669,420 A | * | 9/1997 | Herrero et al. ................ 138/135 |
| 5,730,188 A | * | 3/1998 | Kalman et al. ................ 138/135 |
| 6,016,847 A | * | 1/2000 | Jung et al. ..................... 138/131 |
| 6,024,135 A | | 2/2000 | Nobileau ...................... 138/134 |
| 6,089,276 A | | 7/2000 | Miyazaki et al. ............... 138/98 |
| 6,192,941 B1 | * | 2/2001 | Mallen-Herrero et al. ... 138/135 |
| 6,253,793 B1 | * | 7/2001 | Dupoiron et al. ............. 138/135 |
| 6,338,365 B1 | * | 1/2002 | Odru ............................. 138/134 |
| 6,354,333 B1 | * | 3/2002 | Dupoiron et al. ............. 138/135 |
| 2001/0003992 A1 | * | 6/2001 | Espinasse ...................... 138/135 |

FOREIGN PATENT DOCUMENTS

| | | |
|---|---|---|
| DE | 42 10 978 | 10/1993 |
| EP | 0 136 048 A1 | 4/1985 |
| EP | 0 136 048 B1 | 4/1985 |
| EP | 0 357 658 | 2/1994 |
| GB | 739668 | 11/1955 |
| GB | 833054 | 4/1960 |
| GB | 1 203 127 | 8/1970 |
| GB | 1 314 404 | 4/1973 |
| GB | 2 088 320 | 6/1982 |
| GB | 2 107 814 | 5/1983 |
| GB | 2 167 521 | 5/1986 |
| GB | 2 280 889 | 2/1995 |
| WO | 00/28249 | 5/2000 |
| WO | 02/04856 | 1/2002 |
| WO | WO 02/052184 | 7/2002 |
| WO | WO 2006/016190 | 2/2006 |

OTHER PUBLICATIONS

EP examination Communication dated Dec. 30, 2009 for EP 05 756 248.0 (3 pages).

International Search Report for PCT/GB2005/050101 mailed Feb. 3, 2006.

UK Search Report for GB0513578.5 date of search Mar. 17, 2006 and Apr. 27, 2006 (6 pages).

* cited by examiner

TUBULAR BODIES AND METHODS OF FORMING SAME

This application is the U.S. national phase of international application PCT/GB2005/050101 filed 4 Jul. 2005, which designated the U.S. and claims benefit of GB 0414837.5 filed 2 Jul. 2004, the entire contents of each of which are hereby incorporated by reference.

This invention relates to a tubular bodies and methods of forming same and more particularly but not exclusively to the production of pipes for use in pipework systems such as pipelines for carrying natural gas or petroleum products under pressure. Other forms of tubular bodies such as pylons, towers, support arms and the like may also be manufactured according to the invention described herein.

It is known that natural gas and petroleum products produced in recent years or held in reserve for future extraction contain carbon dioxide and hydrogen sulphide. It is also known that under normal operating conditions of pressure, pipelines formed of conventional materials carrying such products are particularly likely to be subject to failure due to stress corrosion cracking. Such failures often result in catastrophic longitudinally extending fractures of the pipes of the pipelines.

Previous attempts to reduce the risk of such failures have involved the use of corrosion inhibitors, added to the products being carried by the pipelines. Unfortunately, this results in unacceptable costs including not only the cost of the inhibitors and adding them to the products but also the cost of removing and recovering the corrosion inhibitors in due course from the products carried by the pipelines. The use of corrosion inhibitors is also not advisable, particularly in offshore pipelines, due to the environmental problems created if there is any escape of the corrosion inhibitors from the pipelines.

Alternative ways of reducing the risk of stress corrosion cracking in pipes by reducing the tensile stress on the part of the pipes in contact with the products being carried have been proposed. These include the use of pipes formed of, for example, two tubes inserted one inside the other and to then during production mechanically forcing the inner pipe into contact with the outer pipe so that the inner pipe after completion of this operation has a compressive stress and the outer pipe has a tensile stress. This process is known as "auto-frettage" and one way of carrying out this operation mechanically is described in U.S. Pat. No. 4,823,847. It will be appreciated that the two pipes must be made to very tight tolerances if one is to be able to insert one into the other and perform an auto-frettage step without adversely damaging the inner pipe. It will also be appreciated that this particular auto-frettage operation is only suitable for use in small lengths of pipe and suffers from the disadvantage of being a time consuming and therefore expensive operation to carry out. A further disadvantage of the production of a pipeline from such small lengths of pipe, typically 8 to 10 meter lengths, is that it will involve numerous joints being made which in themselves are points of weakness in a pipeline.

Tubular bodies of a different kind are also known from U.S. Pat. No. 4,657,049 in which metal strips are helically wound in overlapping fashion and embedded in an adhesive matrix to produce a rigid tubular structure. U.S. Pat. No. 3,530,567 describes a method of forming a tube by helically winding a metal strip in self-overlapping fashion so that the thickness of the wall of the tube at any point is formed from a plurality of laps. In order to remove the helical ridges on the internal bore of the tube formed by the edges of the strip, the laps of the strip material are flattened one against the other after winding by expanding the tubular structure beyond the yield point of the metal strips. Such a procedure presents significant manufacturing difficulties.

GB2280889 discloses a method of forming a hollow elongated or tubular body and comprises helically winding at least one strip of material in self-overlapping fashion to provide a multi-layer tubular structure. In this arrangement the strip is pre-formed to provide a transverse cross-section having at least one step which, in each convolution of the strip accommodates the overlapping portion of the next convolution. A tubular body having a wall thickness formed of a plurality of laps may thus be continuously made from a single strip of material, the wall thickness generally being one strip thickness greater than the number of steps formed in the cross-section of the strip.

The above arrangement may be provided with internal or external liners, the form of which will depend upon the application for which the tubular structure is intended but may comprise a filament wound fibre-reinforced matrix. In the fabrication of such a tubular structure, the inner liner may be pre-formed so as to provide a mandrel upon which the helically wound reinforcing core is wound. Alternatively an inner liner may be formed by winding resin impregnated reinforcement fibres or fabrics for the inner liner onto a suitable mandrel, and then winding over the liner a stepped steel strip to produce the reinforcement core, followed by winding the required resin impregnated reinforcement fibres or fabrics for an outer liner. Unfortunately, such a process is only able to produce discrete lengths of pipe section and does not lend itself to the use of the "auto-frettage" process.

Presently, the pressure capacity of such pipes is limited by the economics of the materials being used and the weight of the final product which must be transported and moved into position, often in vary difficult circumstances. The most common pipe used in gas transportation has an X65 steel grading (65,000 psi minimum yield strength) but even this standard of pipe cannot meet the newer requirements, which demand up to 120,000 psi yield strength. Whilst one can clearly increase the thickness and specification of the pipe wall, this will only add to the cost, weight, and complexity of installation. Additionally, such arrangements must be girth welded which is difficult to achieve and costly. There is, therefore, a need for a high performance pipe which is both strong and light whilst being economical to produce and relatively easy to transport and install.

The object of the present invention is to provide a tubular body and a method of forming same in which the risk of stress corrosion cracking is reduced and in which one or more of the other above-mentioned disadvantages of the known pipes and methods of forming same are alleviated.

SUMMARY

According to a first aspect of the present invention there is provided a tubular body having an inner hollow tubular core and an outer casing, wherein the outer casing comprises one or more strips of mechanically inter-engaging helically wound material having a higher yield strength than that of the inner core.

According to another aspect of the present invention there is provided a tubular body having an inner tubular core and an outer casing, wherein the outer casing has one or more strips of self-overlapping helically wound material and said core has a tubular structure formed by a continuous forming process.

Preferably, an inner surface of the outer casing is in continuous contact with an outer surface of the core so as to be capable of exerting a compressive force on the core after the core has been subjected to an internal pressure sufficient to cause plastic deformation of the core material.

When it is desired to provide further protection from the environment the tubular body may be provided with a protective casing on the outside of the outer casing.

In a preferred arrangement the strip has a transverse cross-sectional step, which, in each convolution of the strip accommodates the overlapping portion of the next convolution. Alternatively, the strip may have on one edge a longitudinally extending projection and on another edge a longitudinally extending groove, which, in each convolution of the strip accommodates the adjacent edge. In a still further arrangement the strip may have a chamfer on each edge, which, in each convolution of the strip accommodates the overlapping portion of the next convolution.

Preferably, the outer casing is a metal such as steel, stainless steel, titanium or aluminium but is preferably Martinsite.

For some applications the tubular core tubular body advantageously formed of a corrosion resistant material such as stainless steel which may be 316L stainless steel.

In an arrangement particularly suited to continuous production, the tubular body may be a roll formed, seam welded metal tube. Alternatively, the core may be formed from one or ore strips of self over-lapping helically would material.

In one form a mechanical interconnection may be provided in the form of a pre-formed indent and detent, which co-operate with one another in successive convolutions. Preferably, the indent comprises a longitudinally extending indent formed on one side of the strip and the detent comprises a longitudinally extending detent on an opposite side of said strip. These features engage with each other to provide one form of mechanical inter-engagement which may be used alone or in combination with other forms of inter-engagement disclosed herein.

Advantageously, the strip includes two edges and one edge is longer than the other.

A mechanical interconnection may be provided in the form an adhesive layer between the inner core and the outer casing and/or an adhesive layer between overlapping portions of the outer casing. Conveniently, the adhesive layer may be a strip of adhesive applied to the core or the strip and this may be a curable polymer which may comprises a single part film based epoxy, such as Cytec FM8210-1 which may conveniently have having a textile carrier. This adhesive may be used in combination with any other mechanical interconnection described herein.

In a further arrangement of the present invention the tubular body has an end and further includes a connector at an end thereof. This connector may include a ring of corrosion resistant material, said core may comprise a corrosion resistant material and said ring and core may be welded to each other. For convenience and location purposes helical projections may be formed on the tubular body and said connector may include corresponding grooves for engagement with said helical projections.

According to a further aspect of the present invention there is provided a method of manufacturing a tubular body having the steps of: providing a hollow tubular core having a first yield stress; providing a strip of material having a second yield stress higher than the first yield stress; and winding said strip onto said core in a helically overlapping relationship, thereby to form an outer casing surrounding said core.

According to an alternative arrangement there is provided a method of manufacturing a tubular body having a tubular core and an outer casing, said method having the steps of: providing an inner strip of material to form the core; providing a second strip of material to form the outer casing; rolling said inner strip along its longitudinal axis and seam welding confronting edges thereof, thereby to form the tubular core; and winding said outer strip onto said core in a mechanically inter-engaging relationship, thereby to form an outer casing surrounding said core.

According to another aspect of the present invention there is provided a method of manufacturing a tubular body having a tubular core and an outer casing, said method having the steps of: providing an inner strip of material to form the core; providing an outer strip of material to form the outer casing; rolling said inner strip along its longitudinal axis and seam welding confronting edges thereof, thereby to form the tubular core; and winding said outer strip onto said core in a helically overlapping relationship, thereby to form an outer casing surrounding said core.

According to another aspect of the present invention there is provided a method of upgrading a tubular body, said method having the steps of: providing an outer strip of material to form the outer casing; and winding said strip onto said core in a mechanically inter-engaging relationship, thereby to form an outer casing surrounding said core.

According to another aspect of the present invention there is provided a method of upgrading a tubular body, said method having the steps of: providing an outer strip of material to form the outer casing; and winding said strip onto said core in a helically overlapping relationship, thereby to form an outer casing surrounding said core.

Preferably the method includes the step of providing the outer strip in a material with a yield strength higher than the yield strength of the inner core.

Advantageously the strip of material is wound onto the core such as to be in continuous or near continuous contact with said core.

In a preferred arrangement the method includes the step of forming the strip having a transverse cross-sectional step and winding said strip onto said core such that each convolution of the strip accommodates an overlapping portion of a next convolution of said strip.

In a method which lends itself to the continuous production of tubular body, the core material may be formed by roll forming from a strip of metal and seam welding said strip along confronting edges so as to form a metal tube.

Advantageously the method may include the step of forming an indent and detent on said strip and winding said strip onto said core such as to cause said indent or detent to engage with a corresponding indent or detent on another portion of said strip adjacent thereto. The strip may be formed having one edge longer than the other edge so as to impart a degree of clamping of said strip to said core and a further step of applying an adhesive layer between the inner core and the outer casing may be done in order to provide a further degree of mechanical inter-connection. The degree of mechanical interconnection may be enhanced by a further step of applying an adhesive layer between overlapping portions of the strip forming the outer casing. The method may including the step of providing the adhesive in the form of a strip of adhesive applied to the strip prior to it being over wound with a successive layer of said strip. Conveniently the method may include the step of step of applying the adhesive to the strip prior to said strip being wound onto said core and may still further include the step of applying an anti-corrosion coating to the outside of the outer casing. Conveniently, the anti-corrosion coating may be provided in the form of a plastic material spirally wound onto the body.

In order to auto-frettage the tubular member the method preferably includes the step of subjecting the finished tubular body to an internal pressure sufficient to cause elastic deformation of the core material and plastic deformation of the outer casing.

It may be desirable to provide the inner core in the form of a pre-existing pipeline.

Advantageously, the method may include the step of providing an end connector at the, or each, end of the finished tubular body for enabling connection of said body to a further end connector or structure and the end connector may be provided with a recess for receiving a ring which may then be welded to the inner core.

According to another aspect of the present invention there is provided an end connector comprising a body having a bore with at least one helically extending groove corresponding to a detent on a corresponding pipe to which it is to be connected. Advantageously, the connector includes a flange for connecting said connector to another article. For ease of assembly the bore of the connector may be tapered and one or more holes may be provided communicating between an outer surface thereof and the inner bore for receiving an adhesive used to bond the connector to a corresponding pipe to which it is to be connected. Preferably the end connector comprises a recess in an end of said bore for receiving a ring of material compatible with the core material and being connected thereto. When assembled the connector and pipe form a tubular body assembly which may be used as a pipe or structure such as any one of the structures described herein.

Modifications of the above designs present themselves and, in particular, one may adopt an arrangement wherein the strip includes chamfered edges shaped to accommodate the step in the strip and the indent and detent may include flat mutually confronting contact surfaces. In more detail, the indent may comprise mutually confronting inclined surfaces and the detent may include corresponding surfaces for engagement with said confronting surfaces on said indent. Conveniently the mutually confronting surfaces form a saw tooth. Alternatively, the mutually confronting surfaces may be perpendicular to a longitudinal axis of the tubular member.

The steel strip laminate (SSL) technology described and claimed herein offers the energy industry potential new methods of low cost pipeline construction suitable for onshore gas and oil transmission lines and offshore flow lines working in a corrosive environment. Pressure burst tests demonstrated that a 160 mm diameter Helipipe™ comprising a 1 mm thick 316L stainless steel liner and an outer reinforcing layer of two layers of 0.5 mm Martinsite wrapped in a self overlapping arrangement burst at 235Barg which is sufficient to meet and exceed the X200 pipe specification. Detailed Finite Element Analysis on the composite pipe, which was undertaken by the AEA Technology at Harwell, verified that the burst test results were within 2% of the theoretical burst pressure and predicted that Helipipe would be a third of the weight and three times more flexible than the equivalent X65 steel pipe. Economic studies undertaken by Halliburton Subsea 7 and Advanced Engineering Solutions, which predicted that Helipipe was on average 40% cheaper than the conventional X65 steel pipeline.

BRIEF DESCRIPTION OF THE DRAWINGS

Preferred embodiments of the invention will now be described, by way of example only, with reference to the accompanying drawings of which.

DETAILED DISCUSSION OF PREFERRED EMBODIMENT

Figure 1:
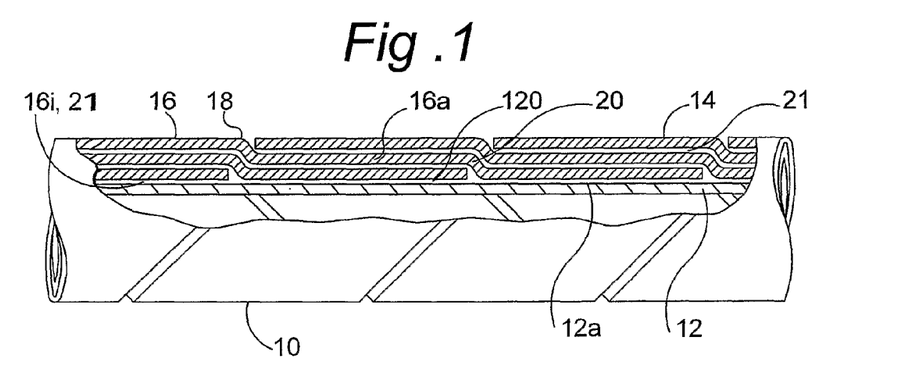
FIG. 1 is a schematic longitudinal view, partially cut-away and partially in section, of a tubular member.

Referring now to FIG. 1 of the drawings, a tubular body indicated generally at 10 forming a pipe for use in a pipework system such as a pipeline carrying natural gas or petroleum products under pressure comprises an inner core in the form of an inner pipe 12 which may be formed by any one of a number of forming processes. In the preferred process the tube 10 comprises a metal tube which is roll formed and welded along confronting surfaces to form the tube. Alternatively, the tube may be drawn as a fully formed tube in either metal or plastics material. When provided as a metal it may be desirable to provide it in the form of a corrosion-resistant material such as stainless steels, alloys or titanium, to name but two suitable materials. An outer casing indicated generally at 14 is formed on the inner metal pipe 12 by helically winding a strip 16 of material onto the outer surface 12a of the pipe 12 in self-overlapping fashion in the manner which is described in detail for the formation of a pipe on a mandrel in the specific descriptions of the applicants U.K. Patent No. 2,280,889 and U.S. Pat. No. 5,837,083. In the present arrangement the tubular body 10 can, if necessary, be continuously constructed by the above-described techniques or by any suitable alternative. The strip 16 has one or more transverse cross-sectional steps 18 and 20 each of which is preferably of a depth corresponding to the thickness of the strip 16. The steps 18, 20 are preferably preformed within the strip 16, each extending from one end of the strip 16 to the other to facilitate an over-lapping centreless winding operation in which each convolution of the strip accommodates the overlapping portion of the next convolution. Whilst the strip may comprise any one of a number of materials such as a plastic, a composite material or indeed metal, it has been found that metal is particularly suitable in view of its generally high strength capability and ease of forming and joining as will be described later herein. Examples of suitable metals include steel, stainless steel, titanium and aluminium, some of which are particularly suitable due to their anti-corrosion capabilities. Particular materials are discussed in the examples tested later herein. The internal surface 16i of the strip 16 and the outer surface of the pipe 12o may be secured together by a structural adhesive, as may the overlapping portions 16a of the strip. The use of an adhesive helps ensure that all individual components of the tubular member 10 strain at a similar rate.

Further advantage may be gained from the application of a protective primer to the metal strip. Martinsite, for example, although high strength and low carbon, it is still mild steel and subject to corrosion. One suitable primer is BR127, available from Cyrec Engineering materials of 1300 revolution St, Hrvre de Grace, Md. 21078 USA from whom a full data sheet may be obtained. This primer is compatible with a wide variety of adhesives, has established corrosion resistance properties and is also a bonding adhesion promoter. Incorporation of this primer, in conjunction with an outer protective wrap of BP's CURVE™ material (CyCURV), as described later herein provides a feasible, high performance protection system that may easily be applied to the present invention. Application of the CURVE™ may be by adhesive bonding if so desired but as this material can be pre formed having a desired radius of curvature adhesive may not be necessary.

Conventional pipeline protection systems (especially 3 layer Fusion Bonded Epoxy) could not be used with the present pipe because of temperature restrictions or process incompatibility. An important enabling feature of the Cytec primer is that it can be applied to flat Martinsite strip and is resistant to the rib forming process without cracking or reduction in properties.

Figure 2:
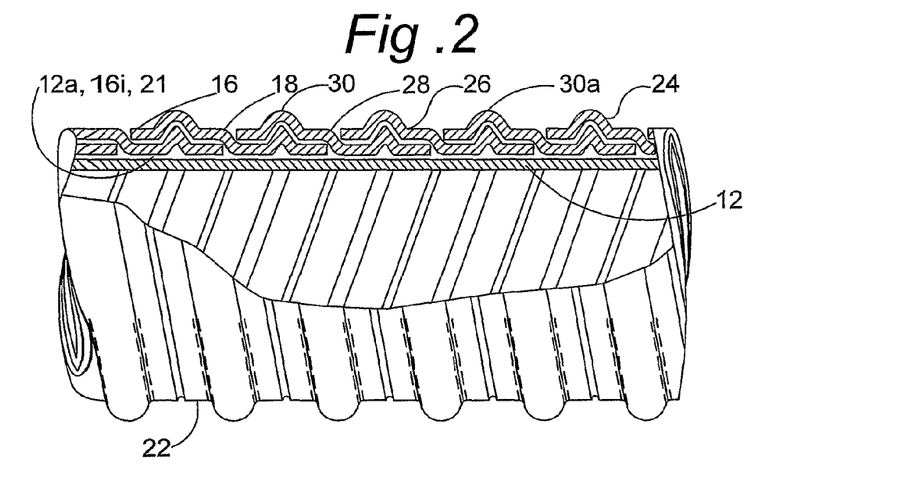
FIG. 2 is a schematic longitudinal view, partially cut-away and partially in section, of an alternative outer casing of the tubular member.

Referring now to FIG. 2 of the drawings, a tubular body indicated generally at 22 has an alternative outer casing 24 formed as previously described from a steel strip 26 having only a single step 28 but which is preformed with a projection 30 forming on one side a detent 30a and on another an indent 30b extending longitudinally of the strip 26 to, in effect, form a helical thread on the external surface of this alternative outer casing 24. It will be appreciated that this alternative form of casing may be would onto the core 12 in the same manner as described above, save for the fact that the strip is wound in overlapping relationship such that the indent 30b on any second layer co-operates with the detent 30b on a previously deposited portion of said strip 26, thereby to locate the layers relative to each other and form said external helical thread which may be used as a location feature for a flange fitted to said tubular structure 12 in the manner described later herein.

In either of the above arrangements the strip 16 or 26 may advantageously be provided with one edge 16a, 26a longer than the other 16b, 26b, thereby to provide a curve to said strip which upon winding onto the core 12 helps secure the strip to the core with a degree of clamping and/or facilitate correct overlapping. Additionally, the adhesives referred to above may take the form of a strip of adhesive applied to the core 12 or the strip 16, 26 prior to or during winding of said strip 16, 26 onto said core 12. The adhesive may, for example comprise a curable polymer and conveniently comprises a single part film based epoxy having a textile liner, such as to facilitate the easy application of the adhesive and the easy curing thereof once it has been deposited. If desired the adhesive may be provided with an anti-bacterial capability or with radiation resistant properties to name but two examples of properties that may be provided. The examples listed below employs Crytec FM 8210-1 as the adhesive. This adhesive may be cured in just two minutes at 180° C. which is in stark contrast with some other adhesives which, in order to be cured in 2 minutes require a temperature of 250° C. which can have a detrimental effect on the adhesive properties. In order to eliminate quality control problems during any manufacturing stage it may be desirable that the Martinsite strip be cleaned/shot blasted/mechanically or chemically etched, degreased, primed and pre-coated with the adhesive in factory conditions and supplied as a roll of production prepared product. It will be appreciated that other forms of adhesive may be used and their selection and suitability will depend on the use to which the final product it to be put. For example, it may be desirable to provide a highly flexible adhesive if the pipe is to be rolled onto a drum for transportation or a very high strength and rigid adhesive when the pipe is used in high strain applications such as high pressure pipelines and support arms.

In other designs of composite pipe, the end connector has proved to be the 'Achilles Heel' of the system. To overcome this problem, the presently proposed end connector uses the pipe's helical protrusions as an anchor to resist the shear stresses between the pipe and connector during the unrestrained pressure tests. The connector is based around a standard BS1560 class 600 flange with the internal bore machined to match the pitch of the pipe's helical protrusions. The connector screws over the helical protrusions and the clearances between the connector and pipe are filled with Araldite™ which is a 2-part cold set structural adhesive available from Huntsman Advanced materials of Duxford, England, from whom the full specification may be obtained. The average lap strength of this adhesive when applied to steel or stainless steel is between 20 and 25 $N/mm^2$ when cured at room temperature or up to 40° C. Three 6 mm holes spaced 120° apart are drilled radially through the rear tapered section of the flange to allow the adhesive to be injected into the annular gap. The bore of the connector is tapered 1.5 degrees to produce a more even stress distribution within the bore. A length of Helipipe was assembled using 316L stainless steel semi hard liners and Martinsite™ windings primed and adhesively film coated with Cytec FM 8210-1 film adhesive at both ends of the pipe. This adhesive is available from Cytec Engineering materials of Anaheim, Calif., USA, from whom a full technical specification may be obtained. This adhesive possesses high shear strength and strain properties (5400 psi lap sheer stress at 75° F.). The end of the windings were cut back 15 mm to stop the epoxy adhesive from gassing during the liner butt-welding process. The end connectors were then screwed onto the pipe and the liners butt-welded to the stainless steel inserts within the connectors. The assembly of the connectors is shown in FIG. 3.

To ease the flow of the adhesive, each connector was heated to 40° C. before pumping the 2-part cold set epoxy adhesive into the annual gap between the connector and the pipe. To ensure controlled filling of the annual gap, three ports were used to pump in the adhesive using a manual cartridge gun. Levelling out the adhesive in this way prevented the entrapment of air bubbles within the epoxy. When the adhesive had filled the potting chamber the epoxy was cured at ~70 to 80° C. for 30 minutes. The pipe was then turned over and the other end potted in a similar manner.

Figure 3:
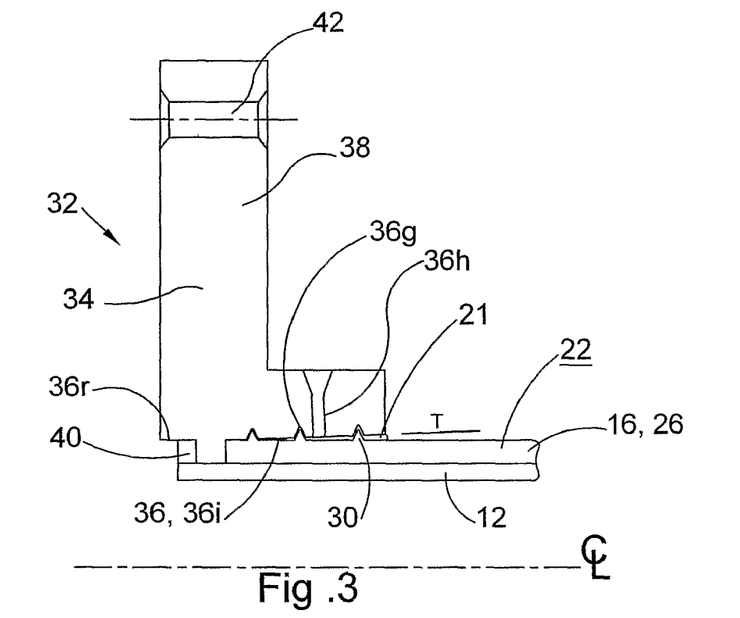
FIG. 3 is a partially sectioned side elevation of a connector for use with the tubular member whose outer casing is shown in FIG. 2.

To provide a continuous protective barrier to transport corrosive products, the pipe's stainless steel liner was butt welded to a ring or flange of stainless steel provided in the connector's bore, as shown in FIG. 3. The circumferential closure weld was a difficult weld to perform because it was located within the bore of the pipe.

Referring now more particularly to FIG. 3 of the drawings, a connector indicated generally at 32 for use with either of the tubular bodies 10 or 22 but more particularly the tubular body 22, consists of a body 34 having a bore 36 therein whose internal surface 36i is provided with helically extending grooves 36g corresponds to the detents 30a formed in the external surface of the outer casing 24 of the tubular body 22. The connector 32 is screwed on to the detents on the external surface of the outer casing 24 and is also secured thereto by the structural adhesive injected through the one or more holes 36h provided on the outside of the connector 32. The end of the body 34 remote from the tubular body 22 has a flange 38 for securing the connector 32 to other conventional pipework fittings (not shown) or has a weld prepared end portion (not shown) for connecting to other conventional pipework.

The end of the bore 36 into which the tubular body 22 is inserted is preferably formed with a taper T to avoid the creation of localised stress on the tubular body 22 under internal pressure during use or bending of the tubular body. The end of the bore 36 adjacent to the flange 38 has a recess 36r into which a ring 40 of material compatible with the material selected to form the core 12 may be inserted and joined thereto by any suitable joining technique. When the body is to be used for the transportation of corrosive products both the core 12 and the ring 40 may be of stainless steel and welded to each other by any conventional welding technique, thereby to form an end on the tubular body suitable for connection. Connection may be achieved by means of the flange 38 which cooperates with a like flange on a further length of tubular member and is secured there to by bolts (not shown) provided through holes 42 provided in the flange.

If desired a further protective coating in the form of a layer of CURVE™ may be provided as a layer of wrapped material around the outside of the pipe. Curve is a low weight, high strength polypropylene material invented by Professor Ian Ward of Leeds University, England, developed by BP and now available from PROPEX of Groneau, Germany. The product comprises a plurality of high tensile fibres of polypropylene woven into a mat and then heated under pressure such that the outer portions of each fibre melts and bonds with its adjacent neighbour whilst maintaining a core of high tensile material. Other forms of protective coating may be used and the present invention should not be considered as being limited to the use of CURVE™. When CURVE™ is employed it may be provided as a long strip and wound onto the outer portion of the tubular body 10 in overlapping or abutting relationship. It may, if desired be adhesively bonded to the tubular body by means of any suitable adhesive such as the Cytec adhesive mentioned above.

Figure 4:
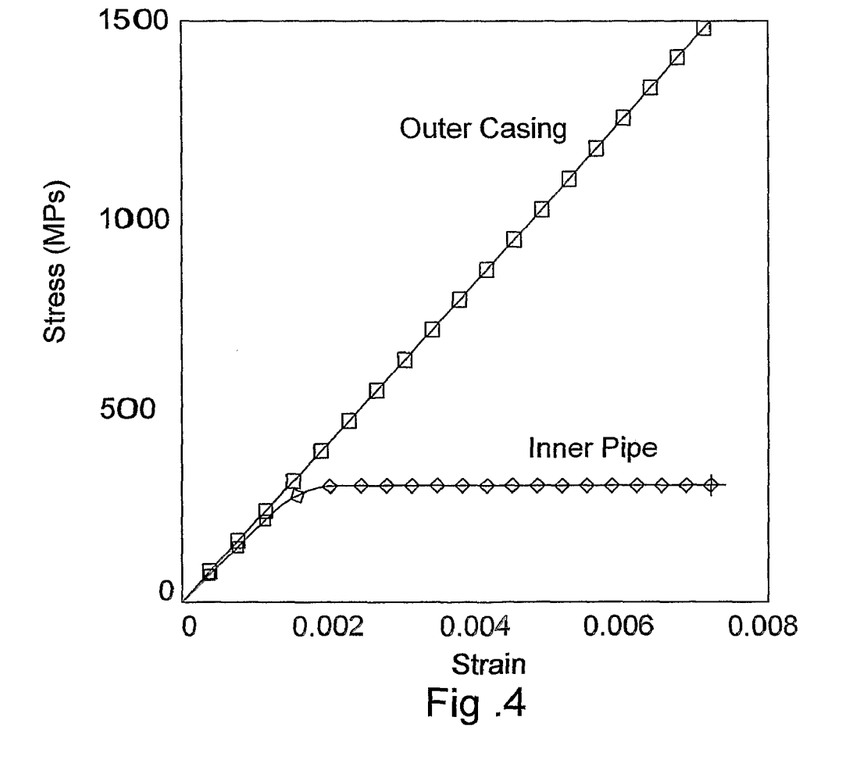
FIG. 4 is a stress strain graph of the tubular member.

The technique known as "auto-frettage" and how it may be applied to the present invention will now be described with reference to FIGS. 4 and 5, where the inner core 12 is formed of a stainless steel having a lower yield strength and better elongation properties than the "Martinsite"™ from which the strips 16, 26 forming the outer casing 14, 24 are formed. The typical stress/strain graph of the selected materials is shown in FIG. 4.

Figure 5:
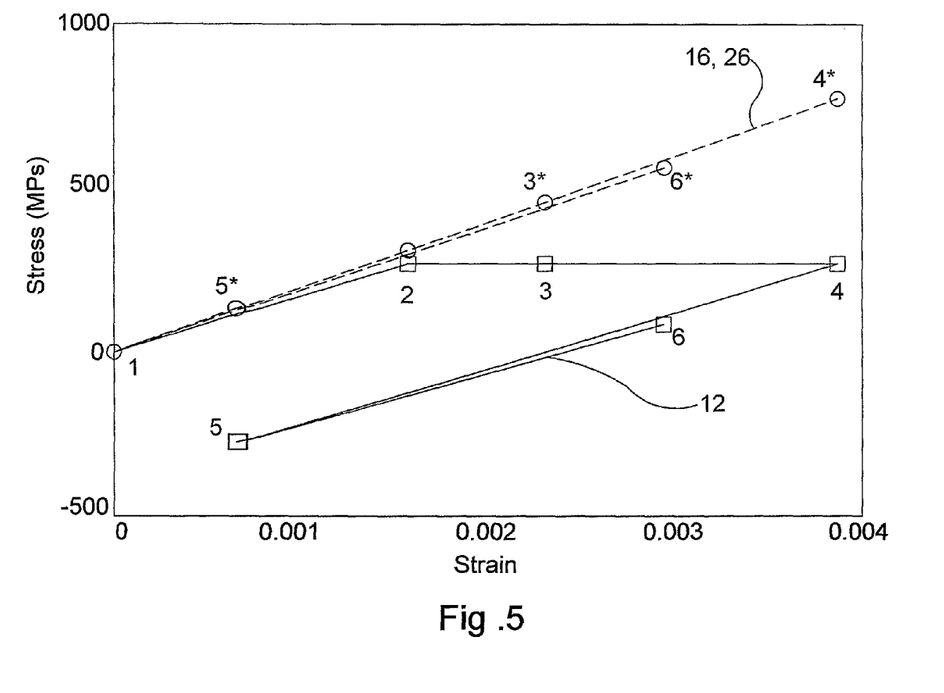
FIG. 5 is a stress strain graph of the tubular member during a pressure treatment cycle.

FIG. 5 shows the stress/strain graphs of the two materials during the "auto-frettage" process. Both materials start with the same zero loading (point 1) and when the composite tubular body described above is subjected to an internal pressure loading to a predetermined "shakedown" pressure limit which is above the yield strain (point 2) of the inner pipe 12 but below the yield strain of the outer casing 16, 26 the inner pipe 12 undergoes yielding and plastic deformation (points 3 and 4) whilst the outer casing 16, 26 remains within its elastic limits as it reaches the stress loadings at its corresponding points 3* and 4*. On unloading the tubular body, the inner core 12 returns to a state of compressive stress under zero load (point 5) whilst the outer casing 16, 26 remains in a state of tensile stress (point 5*) well below its yield stress. On subsequent reloading of the tubular body to a working pressure (up to point 6 and 6*) both the outer casing 16, 26 and the inner core 12 behave in a linear manner and any further load cycling will be within elastic limits and the inner pipe 12 will be operating at a reduced tensile stress level. This reduction in the operating tensile stress of the inner pipe 12 is termed "auto-frettage" and will result in a reduction in the risk of stress corrosion cracking occurring. The stress strain graph of a preferred pressure loading sequence is illustrated in FIG. 5 commencing at 1 with the initial zero stress condition. It will be appreciated that as the inner pipe is effectively compressively "pre-loaded" it may be subjected to internal pressures in normal operation, which, under normal conditions, would result in plastic deformation, whilst remaining below the yield point of that material. It will also be appreciated that not all uses of the invention as described herein will need to be subjected to an "auto-frettage" step. For example, if one simply needs to produce very long lengths of pipe which is not subjected to excessive internal pressures one may simply form the pipe by means of a continuous process of forming the inner core 12 and wrapping the outer casing 16, 26 therearound.

Figure 7:
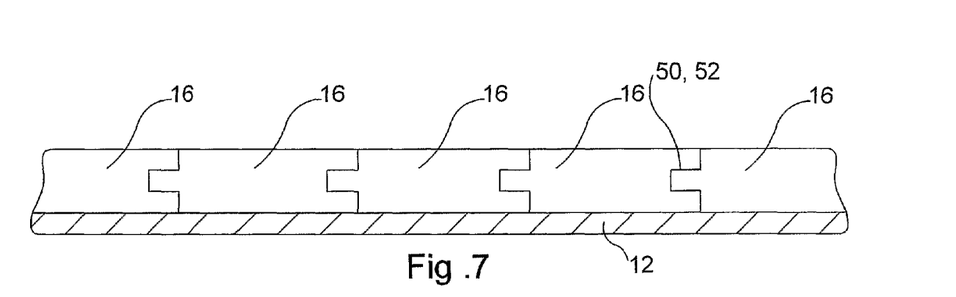
FIGS. 7 to 9 are cross-sectional views of alternative forms of mechanically interlocking arrangements on the presently proposed pipe arrangement.
Figure 8:
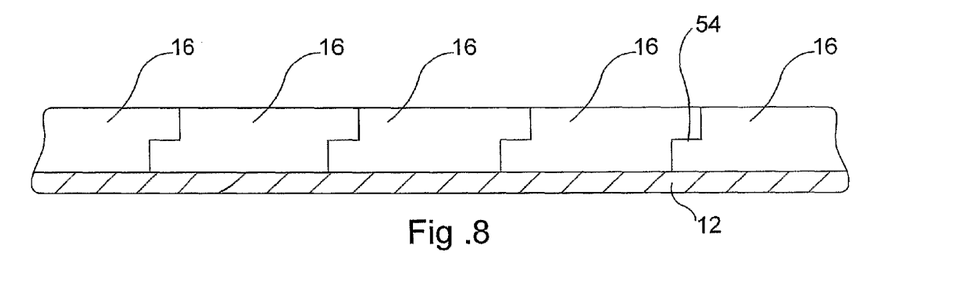
Figure 9:
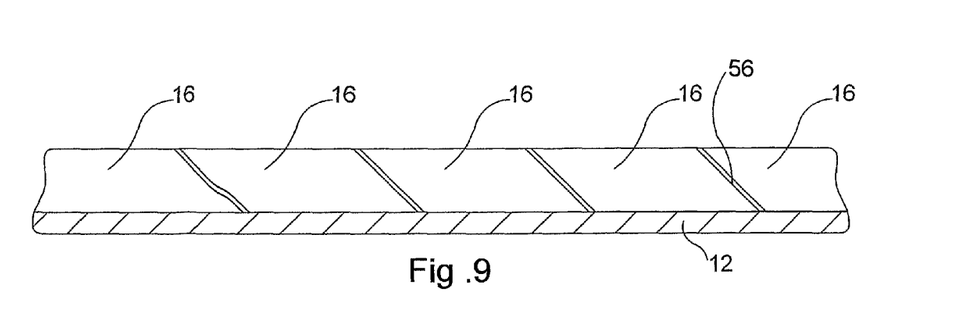

FIGS. 7 to 9 illustrate alternative forms of mechanical engagement. In FIG. 7, the engagement is by means of a longitudinally extending groove 50 provided on one edge of the strip 16 and into which, in operation, a corresponding projection 52 formed on the other side of the strip is fed whilst the strip is laid down onto the core 12. In the arrangement of FIG. 8, a simple step 54 is provided in each edge of the strip such that, in operation, the steps engage with each other upon the strip being applied to the core 12. FIG. 9 illustrates a simpler arrangement in which the edge of strip 16 is simply chamfered at 56 so as to provide an overlapping portion as each revolution of the strip 16 is laid down on the core 12. Each of these mechanical engagements provides an interlock between the edges of the strip and helps strengthen the joint as will be well appreciated by those skilled in the art.

Figure 10:
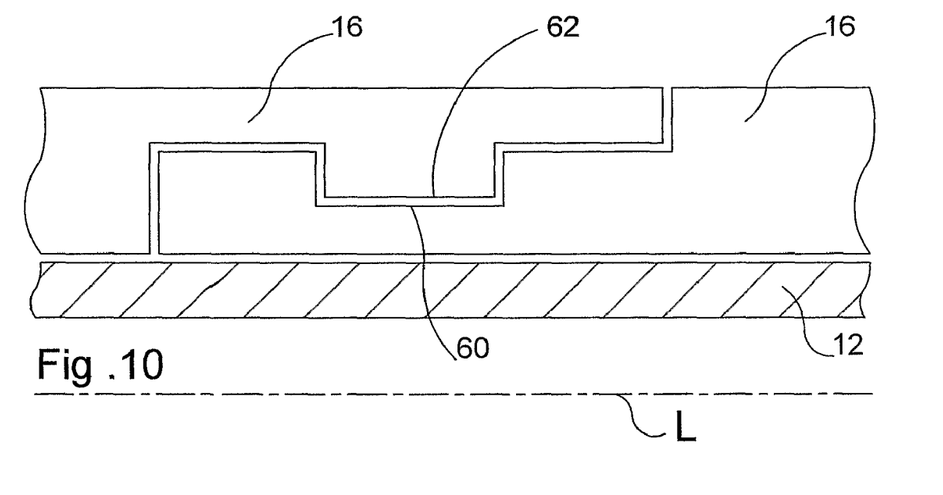
FIGS. 10 and 11 are cross-sectional views of the outer casing and illustrate an interlock arrangement.
Figure 11:
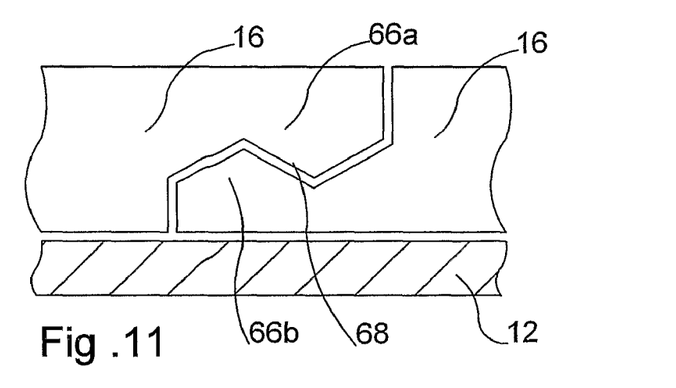

In order to provide an enhanced degree of axial location or restraint in the outer casing it may be desirable to provide an axial lock in the form of inter-engaging members as shown in FIGS. 10 and 11. Referring to FIG. 10, a first form of lock comprises a channel 60 formed in one edge of the strip 16 and extending along the edge of the strip together with a corresponding longitudinally extending projection 62 provided in an overlapping portion of the opposite edge of the strip 16. In operation, the projection 62 is laid down into the channel 60 as the strip 16 is would onto the inner casing 12 and interlocks therewith such as to resist any axial load that may be places on the tubular structure. An alternative arrangement is shown in FIG. 11 in which a saw tooth design is employed. A saw tooth 66a, 66b is provided as a longitudinally extending feature in confronting edges of each side of the strip 16 such that they cooperate with each other as the strip is laid down onto the inner casing 12. In operation the confronting surfaces 68a, 68b of the teeth engage with each other to resist any axial load that my be applied to the tubular member 10. The stress concentration is much lower in this latter option.

Figure 12:
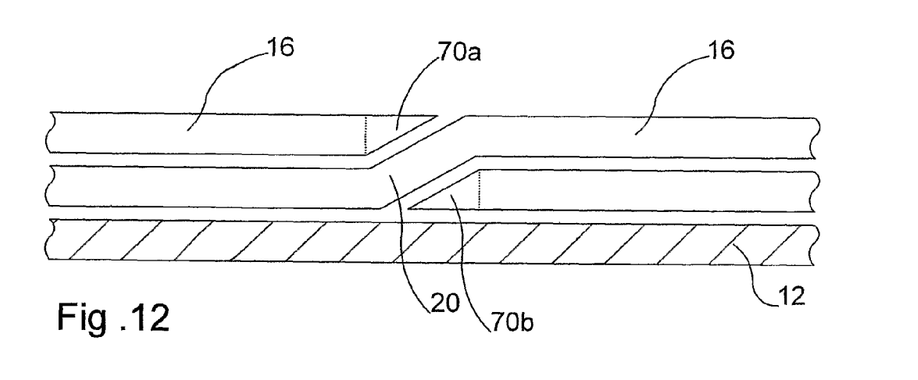
FIGS. 12 and 13 are cross-sectional views of a portion of an alternative arrangement of outer casing.
Figure 13:
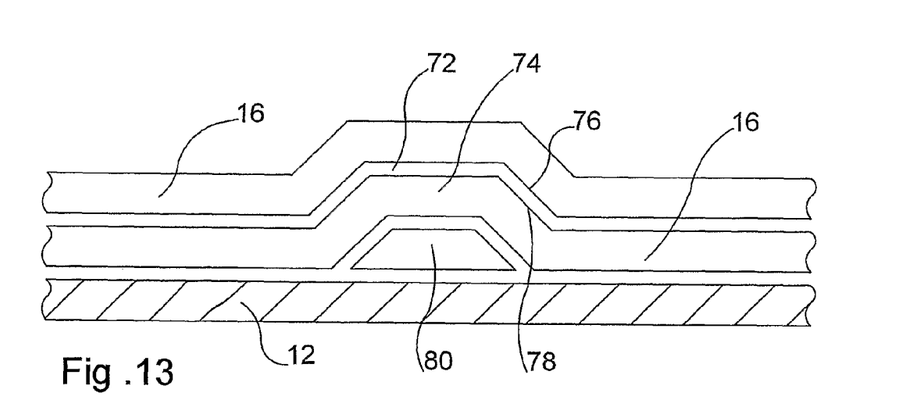

It may be desirable to improve still further the load carrying capacity of the outer casing 16, in which case a design as shown in FIGS. 12 and 13 may be employed. In FIG. 12 the edges of the strip 16 forming the outer casing are chamfered or tapered at 70a, 70b such that, in operation, they more closely fit over the step 20 discussed in detail with reference to FIG. 1 above. It will be appreciated that this design modification increases the thickness of the casing in the region of the overlap which might otherwise be only one layer thick if the strip was bluff ended, as shown by the dotted lines. By increasing the thickness in this manner it is possible to increase the load capacity in this region. FIG. 13 illustrates another modification in which the outer casing 16 is formed from a strip having matching inclined or sloping surfaces rather than the curved surfaces shown in FIG. 2. In essence, a longitudinally extending indent 72 provided along the strip accommodates a longitudinally extending detent 74 provided in a confronting surface of the adjacent convolution of the strip. The sloping surfaces 76, 78 of the indent and detent confront each other and engage with each other when the tubular member is subjected to an axial load. The surfaces 76 are mutually confronting whilst surfaces 78 face away from each other. The contact between the sloping surfaces is such as to more evenly distribute the load than in the embodiment of FIG. 2. A strip of material may be inserted between the indent 72 of an inner portion of the winding and the inner casing 12 so as space fill any void and restrict any adverse stretching of the inner casing when subjected to radial load. This strip may, advantageously be Martinsite, so as to assist with the load carrying capacity of the casing.

In order to manufacture a pipe 10 according to the present invention one must first form an inner liner 12 and then wrap the outer casing onto the liner 12. In practice, the inner liner may be formed by any one of a number of techniques such as metal or plastic extrusion or continuous winding but it has been found that forming a liner by rolling a long strip of metal about its longitudinal axis and then seam welding the confronting surfaces in a continuous manner is particularly suitable. Once the inner liner 12 has been formed one may form the outer casing by wrapping a strip 14 of material around the liner 12 such that each revolution of the strip 14 mechanically engages with the previous revolution. Mechanical engagement may take any one of a number of different forms, some of which are illustrated in the drawings attached hereto. Referring briefly to FIG. 1, one will appreciate that one preferred form of mechanical engagement could comprise a self over-lapping arrangement achieved by deforming the strip 14 along its longitudinal axis before being laid down onto the core 12 such as to provide a step 20 in the strip 14 which acts to locate the overlapping portion of the next revolution of the strip. The strength of this arrangement may be enhanced by applying an adhesive between the layers of the self overlapping portion and, if desired, between the inner liner 12 and the outer portion 14. Alternatives to adhesives may be used, such as mechanical inter-engagement or nano-technology surface modification, which is aimed at attracting confronting surfaces to each other and maintaining them in position once they are suitably engaged. Alternative mechanical inter-locking arrangements are shown in FIGS. 7 to 9 which are discussed above. As an alternative or addition to the above-mentioned mechanical engagement one may form a longitudinally extending projection 30 forming on one side the detent 30a and on the other side the indent 30b mentioned above with reference to FIG. 2. This projection may be formed by passing the strip 14 between a pair of suitably shaped pinch rollers (not shown) before the strip is rolled onto the outer surface of inner core 12, such as to cause the indent 30b to fit over the preceding portion of detent 30a. This mechanical engagement may be used on its own or in combination with one or more of the mechanical engagements discussed herein. Each of the above arrangements may be enhanced by the step of applying an adhesive in the form discussed above to the contacting surfaces of the overlapping outer layer 14 and/or between the inner liner 12 and the outer strip 14.

The original build specimen is detailed in the first column of Table 1 below and the liner's yield strength was selected to be as high as possible to match that of the Martinsite (1350 MPa). Therefore heavily cold worked 316L stainless steel with a 862 Mpa ultimate tensile stress (UTS) was selected. Whilst this specimen did not burst until the test pressure reached 110Barg, this pressure was considered to be somewhat lower than might be expected. After investigation it was realised a disadvantage of this material is that the weld heat affected zone (HAZ) has limited strain capacity and could not strain follow the Martinsite and it was concluded that this problem could be addressed by lowering the yield stress of the inner liner such that, even when welded, it is able to accommodate the strain under which it is placed.

The pipe was then redesigned employing fully annealed stainless steel with a high strain capacity but with a much lower yield strength at 306/308 MPa. and this didn't burst until a pressure of 235 Barg was achieved. Such a mismatch in yield strengths between the liner and the reinforcing windings allows the pipe to fully incorporate the principles of auto-frettage to gain the maximum working pressure from the composite assembly. The original and modified build specifications are shown in the following table where the 0.2% proof stress is substantially equal to the yield stress:

TABLE 1

TEST SPECIMEN BUILD DETAILS

| PROPERTIES | ORIGINAL BUILD SPECIMENS | MODIFIED BUILD SPECIMENS |
|---|---|---|
| Reinforcing Windings Material | Martinsite 220 | Martinsite 220 |
| Winding Strip Thickness | 0.5 mm | 0.5 mm |
| Yield Stress | 1350 MPa | 1350 MPa |
| UTS | 1550 MPa | 1550 MPa |
| % Elongation | 4.5% | 4.5% |
| Liner Material | Semi Hard cold worked 316L Stainless Steel | Fully annealed 316L Stainless Steel |
| Liner Thickness | 0.77 mm | 1.00 mm |
| 0.2 Proof Stress | 747/771 MPa | 306/308 MPa |
| UTS | 862/872 MPa | 604/605 MPa |
| % Elongation Parent material | 17%/18% | 45% |
| Vickers Hardness Number VHN | 295 | 160 |
| Adhesive primer | Solvent based Cytec BR127 | Solvent based Cytec BR127 |
| Adhesive | Single Part Film Based Epoxy with Textile Carrier Cytec FM 8210-1 | Single Part Film Based Epoxy with Textile Carrier Cytec FM 8210-1 |
| Build Specification | Liner wall = 0.75 mm<br>2 layers Martinsite = 1.0 mm<br>2 layers adhesive = 0.34 mm<br>Wall thickness = 2.09 mm | Liner wall = 1.00 mm<br>2 layers Martinsite = 1.0 mm<br>2 layers adhesive = 0.34 mm<br>Wall thickness = 2.34 mm |

In each of the above specimens the bore of the pipe was 160 mm.

Whilst it will be appreciated that one may use a number of different materials for the core and the outer casing we have conducted tests on the above and found the combination of a core fully annealed 36L Stainless Steel having a yield stress of 280 MPa and a high strength Martinsite™ reinforcing outer casing 16, 26 having a yield stress of 1350 MPa provides excellent results. The table below provides details of the auto-frettage pressures used on this preferred sample.

DESIGN CALCULATIONS FOR HELIPIPE PRESSURE TEST INCORPORATING AUTO-FRETTAGE

| Working Pressure Bar | Shakedown Pressure Bar | Liner Yield Pressure after shakedown | Liner Stress range after shakedown MPa | Martinsite Stress range after shakedown MPa |
|---|---|---|---|---|
| 94 | 140 | 141 | −205/138 | 186/586 |

It has been calculated that operating with a working pressure of 94 bar and subject to a shakedown pressure of 140 bar, the stress range in the 316L liner would vary from 205 MPa compressive stress to 138 MPa tensile stress. This has dramatically deceased the tensile stress in the liner, which is ideal for fatigue and stress corrosion cracking. The Martinsite reinforcing windings would operate at a maximum stress of 586 MPa and have a residual stress of 186 MPa. With a yield of 1350 MPa the winding will have a factor of safety (FOS) of 2.3

The above test sample was pressure tested at 20° C. and failed at a pressure of 235.5 Barg. At this pressure the end connector showed no sign of failure or distortion.

The table below gives the results of further cases for which the liner is 6 mm of X42 (yield stress of 290 MPa) and the pipe has a diameter of 900 mm. Parameters have been adjusted to give a SF in the martinsite of about 2.

TABLE 3

Helipipe Design Cases (No Axial Load)

| | Case | | | | |
|---|---|---|---|---|---|
| | F1 | F2 | G1 | G1a | G2 |
| WP Bar | 104 | 101 | 201 | 205 | 203 |
| Martinsite grade | M220 | M130 | M220 | M220 | M130 |
| Martinsite yield stress MPa | 1350 | 923 | 1350 | 1350 | 923 |
| Martinsite thickness Mm | 6.5 | 8.5 | 13.0 | 10.0 | 20.0 |
| FOS (after shakedown) | 2.2 | 2.1 | 2.2 | 1.8 | 2.2 |
| Liner hoop stress range (ZP to WP after shakedown) MPa | −270 +103 | −180 +133 | −290 +186 | −290 +288 | −236 +115 |
| Martinsite hoop stress range (ZP to WP after shakedown) MPa | 249 622 | 127 440 | 134 610 | 174 752 | 71 422 |

In the above, ZP is zero pressure and WP is working pressure.

Cases F1 and F2 are for a nominal WP of 100 Bar and show the effect of changing the martinsite grade from the strongest (M220) to the weakest (M130). In both cases the liner yields at the SP (1.5*WP) and goes into compression at WP: but does not go into reverse yield.

Cases G1 and G2 are for a nominal WP of 200 Bar, again with changes in Martinsite grade explored. In case G1 the liner yield in tension at SP and also in compression at ZP (i.e. reverse yield), but on reloading the liner stress is below yield and so plastic cycling does not occur.

TABLE 4

| Case | F1 | G1 | G1a |
|---|---|---|---|
| WP Bar | 104 | 201 | 205 |
| Martinsite grade | M220 | M220 | M220 |
| Martinsite yield stress MPa | 1350 | 1350 | 1350 |
| Martinsite thickness Mm | 6.5 | 13.0 | 10.0 |
| FOS (after shakedown) | 2.2 | 2.2 | 1.8 |
| Liner hoop stress range (ZP to WP after shakedown) MPa | −270 +103 | −290 +186 | −290 +288 |
| Martinsite hoop stress range (ZP to WP after shakedown) MPa | 249 622 | 134 610 | 174 752 |

In the above FSO is factor of safety.

TABLE 5

(No Axial Load)

| Case | H |
|---|---|
| OD (mm) | 160 |
| WP Bar | 105 |
| Martinsite grade | M220 |
| Martinsite yield stress MPa | 1350 |
| Martinsite thickness Mm | 1 |
| Liner Material | 316L |
| Liner PS MPa | 300 |
| Liner Thickness mm | 1 |
| FOS (after shakedown) | 1.8 |
| Liner hoop stress range (ZP to WP after shakedown) MPa | −299 +100 |
| Martinsite hoop stress range (ZP to WP after shakedown) MPa | 299 740 |

Figure 6:
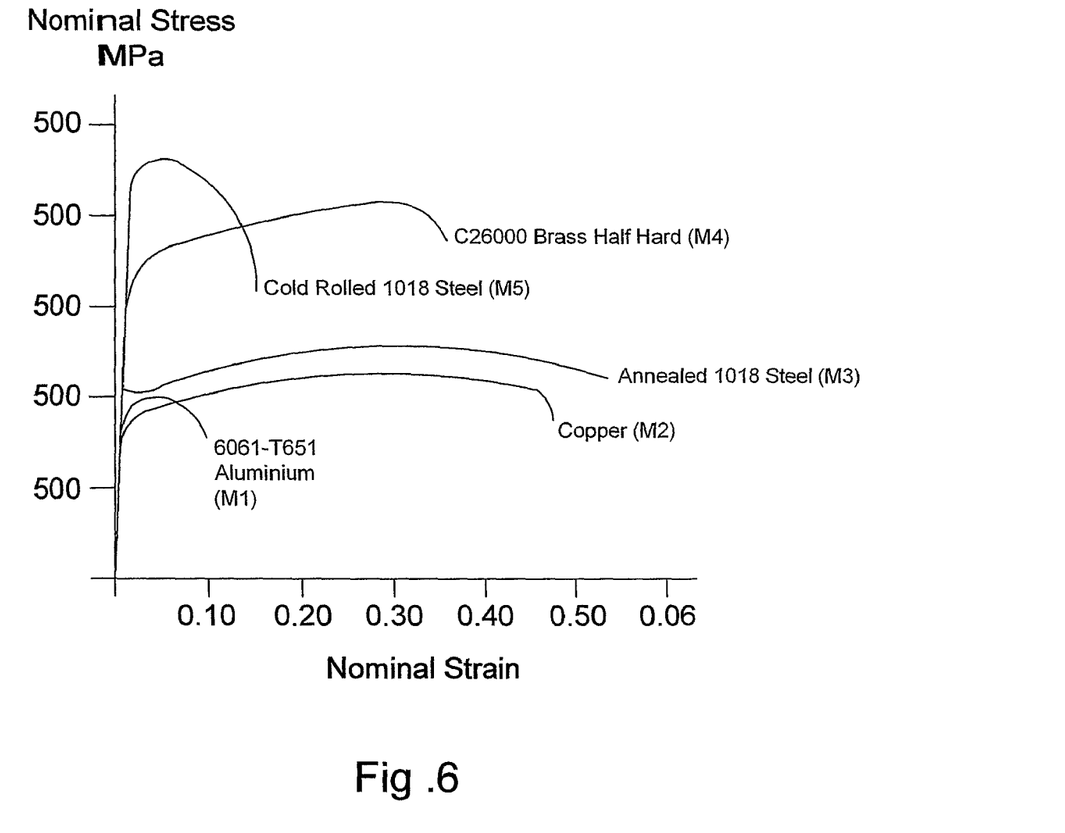
FIG. 6 is a stress strain graph of a number of other alternative materials which may lend themselves to inclusion as materials in a tubular body according to the present invention.

It will be appreciated that many other materials may be selected for use in the manufacture of a tubular body according to the present invention. By way of example only, we draw the reader's attention to FIG. 6 which illustrates the stress strain curves for a number of different materials. From this Figure it can be seen that the stress strain curve for 6061-T651 Aluminium (M1) would lend itself to use as a liner material due to its relatively low yield stress. Additional materials such as Copper (M2), annealed 1018 Steel (M3) and possibly half rolled C2600 brass (M4) may also be suitable, when matched with a casing material having a suitably high yield stress. Cold rolled 1018 Steel (M5) is also an option but its relatively high yield should be taken into consideration. When selecting the combination of materials one should remember that the outer casing needs to be stronger than the inner core so as to allow the core to experience plastic deformation during the "auto-frettage" step whilst the outer casing remains under elastic strain conditions so that upon returning to zero pressure the inner core is subjected to compressive stresses and the outer casing remains under tensional stress and provides the inner core with its compressive stress.

Although the production of a new tubular body 10 is described above, it will be appreciated that this procedure with the inner pipe 12 being constituted by an existing pipe can be utilised to refurbish and up-grade an existing pipe of a pipeline or the like and also to produce pylons, towers, support arms, drive shafts and sub-sea dynamic risers, to name but a few examples.

A particular advantage of one form of the present invention resides in the fact that the "auto-frettage" process can be performed once the length of pipe has been installed in its final location. Under such circumstances one simply needs to subject the pipe to the "auto-frettage" process by raising the pressure of the fluid within the core 12 in order to follow the profile shown in FIG. 5. The core 12 essentially expands beyond its elastic limit and upon relaxation of the internal pressure is subjected to a compressive force from the outer casing 16, 26 such that, upon subsequent raising of the internal pressure to the desired working pressure the inner core 12 remains well below its elastic limit and is, therefore, less prone to stress corrosion cracking.

It will be appreciated that the present forming process may be employed to produce a tapered product by simply winding the convolutions in a manner which results in the product diameter increasing or decreasing as the product is formed. This arrangement may be very beneficial in the production of towers or other such products where a load spreading effect is required or where one simply needs to alter the diameter for other performance or aesthetic requirements.

The design of the preferred pipe is based around a corrosion resistant pressure containing liner supported by fully elastic high strength Martinsite windings. Under high internal pressures the Martinsite windings remain elastic and carry the majority of the hoop stress. The role of the liner is to strain follow the Martinsite windings to order to provide a leak free passage for the product.

Any test data provided herein is provided in relation to designs not incorporating the features of FIGS. 7 to 13, from which additional benefit may be obtained.

The invention claimed is:

1. A tubular body comprising an inner hollow tubular metal core and an outer casing, wherein the outer casing has at least one metal strip of mechanically inter-locking, self overlapping helically wound material having a higher yield strength than that of the inner core, wherein interlocking prevents relative axial movement of successive convolutions of the at least one metal strip, said at least one metal strip includes an indent and a detent, said indent and said detent configured to interengage on successive convolutions to exert a compressive force on said core after said core has been plastically expanded.

2. A tubular body as claimed in claim 1 wherein said core comprises a tubular structure formed by a continuous forming process.

3. A tubular body as claimed in claim 1 wherein an inner surface of the outer casing is in continuous contact with an outer surface of the core so as to be capable of exerting a compressive force on the core after the core has been plastically expanded.

4. A tubular body as claimed in claim 1 wherein the tubular body has a protective casing on the outside of the outer casing.

5. A tubular body as claimed in claim 1 wherein the strip has a transverse cross-sectional step, which, in each convolution of the strip accommodates the overlapping portion of the next convolution.

6. A tubular body as claimed in claim 1 wherein the strip has on one edge a longitudinally extending projection which forms said detent and on another edge a longitudinally extending groove which forms said indent, which, in each convolution of the strip, accommodates the adjacent edge of a successive convolution.

7. A tubular body as claimed in claim 1 wherein the strip has a chamfer on each edge, which, in each convolution of the strip accommodates the overlapping portion of the next convolution.

8. A tubular body as claimed in claim 1 wherein the outer casing is selected from the group comprising at least one of steel, stainless steel, titanium and aluminium.

9. A tubular body as claimed in claim 8 wherein the strip comprises Martinsite.

10. A tubular body as claimed in claim 1 wherein the core material comprises a corrosion resistant material.

11. A tubular body as claimed in claim 10 wherein the core material comprises stainless steel.

12. A tubular body as claimed in claim 11 wherein the core material comprises 316L stainless steel.

13. A tubular body as claimed in claim 1 wherein the core comprises a roll formed, seam welded metal tube.

14. A tubular body as claimed in claim 1 in which the indent comprises a longitudinally extending indent formed on one side of the strip and the detent comprises a longitudinally extending detent formed on an opposite side of said strip.

15. A tubular body as claimed in claim 1 wherein the strip includes two edges and one edge is longer than the other.

16. A tubular body as claimed in claim 1 wherein the body further includes an adhesive layer between the inner core and the outer casing.

17. A tubular body as claimed in claim 1 wherein the body further includes an adhesive layer between overlapping portions of the outer casing.

18. A tubular body as claimed in claim 17 wherein the adhesive layer comprises a strip of adhesive applied to the core or the strip.

19. A tubular body as claimed in claim 16 wherein the adhesive or adhesives comprises a curable polymer.

20. A tubular body as claimed in claim 16 wherein the adhesive comprises a single part film based epoxy having a textile carrier.

21. A tubular body as claimed in claim 16 wherein the adhesive comprises Cytec FM 8210-1.

22. A tubular body as claimed in claim 1 wherein the tubular body has an end and further includes a connector at an end thereof.

23. A tubular body as claimed in claim 22 wherein the connector includes a ring of corrosion resistant material, said core comprises a corrosion resistant material and said ring and core are welded to each other.

24. A tubular body as claimed in claim 22 wherein the tubular body includes helical projections and said connector includes corresponding grooves for engagement with said helical projections.

25. A tubular body as claimed in claim 1 when constituted as a component selected from the list of: pylon, tower, support arm, drive shaft and sub-sea dynamic riser.

26. A tubular body as claimed in claim 6 in which the adhesive has anti-bacterial or radiation resistant properties.

27. A method of manufacturing a tubular body according to claim 1, said body having a tubular core and an outer casing, said method comprising the steps of:
   providing a hollow tubular core having a first yield strength;
   providing a strip of material having a second yield strength higher than the first yield strength; and
   winding said strip onto said core in a mechanically inter-engaging relationship, thereby to form an outer casing surrounding said core.

28. A method as claimed in claim 27 including the steps of:
   providing said hollow tubular core in the form of an inner strip of material;
   rolling said inner strip along its longitudinal axis and seam welding confronting edges thereof, thereby to form the tubular core; and
   winding said outer strip onto said core in a mechanically inter-engaging relationship, thereby to form an outer casing surrounding said core.

29. A method as claimed in claim 27, including the step of:
   winding said outer strip onto said core in a helically overlapping relationship, thereby to form an outer casing surrounding said core.

30. A method as claimed in claim 27 including the step of:
   providing said hollow tubular core in the form of a pre-existing pipeline.

31. A method as claimed in claim 27 in which the strip of material is wound onto the core such as to be in continuous or near continuous contact with said core.

32. A method as claimed in claim 27 including the step of forming the strip having a transverse cross-sectional step and winding said strip onto said core such that each convolution of the strip accommodates an overlapping portion of a next convolution of said strip.

33. A method as claimed in claim 27 including the step of forming the core material by roll forming from a strip of metal and seam welding said strip along confronting edges so as to form a metal tube.

34. A method as claimed in claim 27 including the step of forming an indent and detent on said strip and winding said strip onto said core such as to cause said indent or detent to engage with a corresponding indent or detent on another portion of said strip adjacent thereto.

35. A method as claimed in claim 34 including the step of forming the indent and detent as a longitudinally extending indent on one side of the strip and a longitudinally extending detent on an opposite side of said strip.

36. A method as claimed in claim 27 including the step of forming the strip having one edge longer than the other edge.

37. A method as claimed in claim 27 including the step of applying an adhesive layer between the inner core and the outer casing.

38. A method as claimed in claim 27 including the step of applying an adhesive layer between overlapping portions of the strip forming the outer casing.

39. A method as claimed in claim 38 including the step of providing the adhesive in the form of a strip of adhesive applied to the strip prior to it being over wound with a successive layer of said strip.

40. A method as claimed in claim 37 including the step of applying the adhesive to the strip prior to said strip being wound onto said core.

41. A method as claimed in claim 27 including the further step of applying an anti-corrosion coating to the outside of the outer casing.

42. A method as claimed in claim 41 including the step of applying the anti-corrosion coating in the form of a plastic material spirally wound onto the body.

43. A method as claimed in claim 27 including the step of subjecting the finished tubular body to an internal pressure sufficient to cause plastic deformation of the core material and elastic deformation of the outer casing.

44. A method as claimed in claim 27 in which the inner core is provided in the form of a pre-existing pipeline.

45. A method as claimed in claim 27 including the step of providing an end connector at the or each end of the finished tubular body for enabling connection of said body to a further end connector or structure.

46. A method as claimed in claim 45 including the steps of providing a ring of material compatible with the inner core within a recess in said end connector and welding the inner core to said ring at an end of said core.

47. A tubular body as claimed in claim 1 wherein the strip includes chamfered edges shaped to accommodate a step in the strip.

48. A tubular member as claimed in claim 1 wherein the indent comprises mutually confronting inclined surfaces and the detent includes corresponding surfaces for engagement with said confronting surfaces on said indent.

49. A tubular member as claimed in claim 48 wherein the mutually confronting surfaces form a saw tooth.

50. A tubular body comprising an inner hollow tubular metal core and an outer casing, wherein the outer casing has at least one metal strip of mechanically inter-locking, self overlapping helically wound material having a higher yield strength than that of the inner core, an inner surface of said outer casing is in continuous contact with an outer surface of said core, wherein interlocking prevents relative axial movement of successive convolutions of the at least one metal strip, said at least one metal strip includes an indent and a detent, said indent and said detent configured to interengage on successive convolutions to exert a compressive force on said core after said core has been plastically expanded.

* * * * *